(12) United States Patent
Kollatschny et al.

(10) Patent No.: US 7,901,613 B2
(45) Date of Patent: Mar. 8, 2011

(54) VACUUM MANDREL FOR USE IN FABRICATING AN IMPLANTABLE ELECTRODE

(75) Inventors: Shawn D. Kollatschny, Pearland, TX (US); Joseph J. Sciacca, Houston, TX (US)

(73) Assignee: Cyberonics, Inc., Houston, TX (US)

( * ) Notice: Subject to any disclaimer, the term of this patent is extended or adjusted under 35 U.S.C. 154(b) by 0 days.

(21) Appl. No.: 12/652,185

(22) Filed: Jan. 5, 2010

(65) Prior Publication Data

US 2010/0101944 A1    Apr. 29, 2010

Related U.S. Application Data

(62) Division of application No. 11/257,339, filed on Oct. 24, 2005, now abandoned.

(51) Int. Cl.
    *B29C 70/72* (2006.01)
(52) U.S. Cl. .............. 264/511; 264/272.15; 427/2.24
(58) Field of Classification Search ............ 264/511, 264/272.15; 427/2.24
    See application file for complete search history.

(56) References Cited

U.S. PATENT DOCUMENTS

| | | | |
|---|---|---|---|
| 3,421,511 A | 1/1969 | Schwartz et al. | |
| 3,760,812 A | 9/1973 | Timm et al. | |
| 4,284,856 A * | 8/1981 | Hochmair et al. | 607/9 |
| 4,384,926 A | 5/1983 | Wagner | |
| 4,459,989 A | 7/1984 | Borkan | |
| 4,508,053 A | 4/1985 | Eriksson | |
| 4,573,481 A | 3/1986 | Bullara | |
| 4,590,946 A | 5/1986 | Loeb | |
| 4,608,985 A | 9/1986 | Crish et al. | |
| 4,612,934 A | 9/1986 | Borkan | |
| 4,628,942 A | 12/1986 | Sweeney et al. | |
| 4,649,936 A | 3/1987 | Ungar et al. | |
| 4,686,765 A * | 8/1987 | Byers et al. | 29/858 |
| 4,850,356 A | 7/1989 | Heath | |
| 4,860,616 A | 8/1989 | Smith | |
| 4,920,979 A | 5/1990 | Bullara | |
| 4,979,511 A | 12/1990 | Terry, Jr. | |
| 5,003,975 A | 4/1991 | Hafelfinger et al. | |
| 5,037,497 A * | 8/1991 | Stypulkowski | 156/245 |
| 5,095,905 A | 3/1992 | Klepinski | |
| 5,215,089 A | 6/1993 | Baker, Jr. | |
| 5,251,634 A | 10/1993 | Weinberg | |
| 5,351,394 A | 10/1994 | Weinberg | |
| 5,531,778 A | 7/1996 | Maschino et al. | |
| 5,961,909 A * | 10/1999 | Iverson | 264/219 |
| 6,304,787 B1 | 10/2001 | Kuzma et al. | |
| 6,418,348 B1 | 7/2002 | Witte | |

(Continued)

OTHER PUBLICATIONS

Restriction Requirement dated Oct. 31, 2007 for U.S. Appl. No. 11/257,339.

(Continued)

*Primary Examiner* — Robert B Davis
(74) *Attorney, Agent, or Firm* — Conley Rose, P.C.; Jonathan D. Rowell; Darrell N. Fuller

(57) ABSTRACT

A vacuum mandrel for use in fabricating an implantable electrode comprises a hollow body member and a first groove provided radially on an outer surface of the hollow body member. The first groove is adapted to receive an implantable electrode and retain the electrode in place with a vacuum pressure during an elastomeric encapsulation of the electrode. The vacuum mandrel further comprises a vacuum port provided in the first groove.

9 Claims, 4 Drawing Sheets

U.S. PATENT DOCUMENTS

| | | | |
|---|---|---|---|
| 6,477,417 B1 | 11/2002 | Levine | |
| 6,782,619 B2 * | 8/2004 | Corbett et al. | 29/858 |
| 6,907,295 B2 | 6/2005 | Gross et al. | |
| 7,167,750 B2 | 1/2007 | Knudson et al. | |
| 7,444,183 B2 | 10/2008 | Knudson et al. | |
| 7,532,938 B2 | 5/2009 | Machado et al. | |

OTHER PUBLICATIONS

Response to Restriction Requirement dated Oct. 31, 2007 for U.S. Appl. No. 11/257,339 filed Dec. 21, 2007.

Office Action dated Mar. 31, 2008 for U.S. Appl. No. 11/257,339.

Response to Office Action dated Mar. 31, 2008 for U.S. Appl. No. 11/257,339 filed May 23, 2008.

Final Office Action dated Sep. 15, 2008 for U.S. Appl. No. 11/257,339.

Appeal Brief filed Dec. 29, 2008 for U.S. Appl. No. 11/257,339.

Office Action dated Apr. 13, 2009 for U.S. Appl. No. 11/257,339.

Appeal Brief filed May 13, 2009 for U.S. Appl. No. 11/257,339.

Office Action dated Oct. 27, 2009 for U.S. Appl. No. 11/257,339.

* cited by examiner

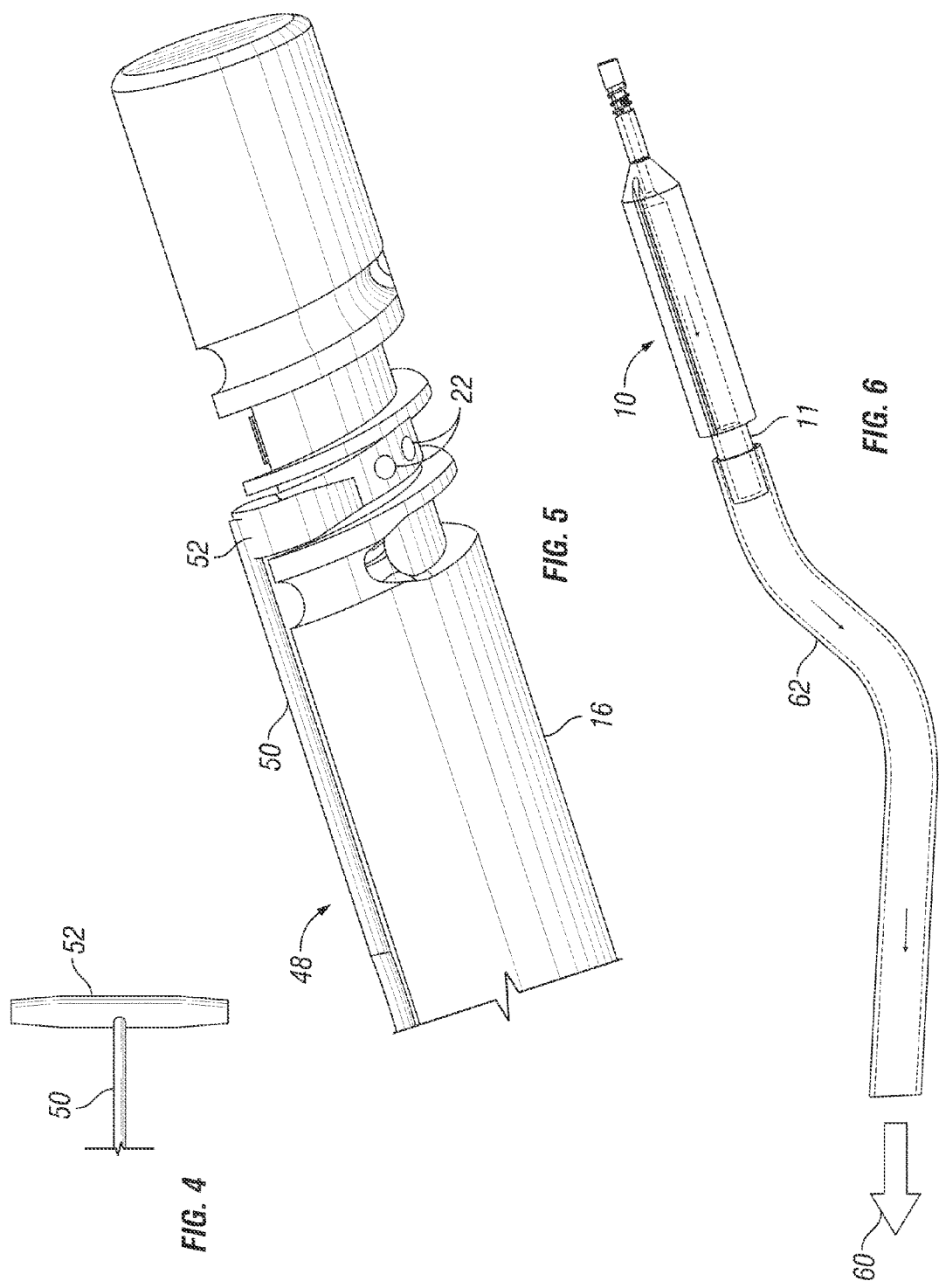

US 7,901,613 B2

VACUUM MANDREL FOR USE IN FABRICATING AN IMPLANTABLE ELECTRODE

BACKGROUND

Many types of implantable medical devices, such as pacemakers, defibrillators, and vagus nerve stimulators, have leads connected to an electronics unit. The distal end of the lead typically comprises or is coupled to one or more conductive electrodes. Such electrodes are typically fragile and thus should be handled carefully by the implanting surgeon when attaching the electrode to the relevant tissue to be stimulated. Fabrication of such electrodes is often a painstaking, time-consuming process.

BRIEF SUMMARY

A vacuum mandrel is disclosed that is used during the fabrication of an implantable conductive electrode. In accordance with at least one embodiment, the mandrel comprises a hollow body member having an axis, a first groove provided radially on an outer surface of the hollow body member, and a vacuum port provided in the groove. The first groove is adapted to receive the implantable electrode. In a particular embodiment, the first groove is a spiral groove around the outer periphery of the hollow body. By application of vacuum pressure through the hollow body member and the vacuum port, an electrode can be retained in place in the first groove while an elastomer, or another type of insulating material, is applied to the electrode. One or more second grooves, which are preferably longitudinal relative to the axis of the hollow body member, may be provided on opposing ends of the spiral groove to receive the elastomer and thereby form gripping members that an implantation surgeon can use when coupling the resulting electrode to a neural tissue such as a vagus nerve.

In accordance with another embodiment, a method comprises locating a conductive electrode formed on end of a lead adjacent a first, preferably spiral, groove in a vacuum mandrel, retaining the conductive electrode in the first groove through vacuum pressure applied through the at least one port, and applying an insulator over the conductive electrode while the electrode is retained in place in the first groove. The first groove contains at least one port through which the vacuum is applied to retain the conductive electrode in place.

BRIEF DESCRIPTION OF THE DRAWINGS

For a detailed description of exemplary embodiments of the invention, reference will now be made to the accompanying drawings in which:

FIG. 4 shows a ribbon electrode provided on a lead;

FIG. 5 shows a view of the vacuum mandrel with an electrode wrapped around a groove formed in the mandrel in accordance with a preferred embodiment of the invention;

FIG. 6 illustrates the connection between the vacuum mandrel and a vacuum source;

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. Any numerical dimensions provided herein are merely exemplary and do not limit the scope of this disclosure or the claims that follow.

Figure 1A:
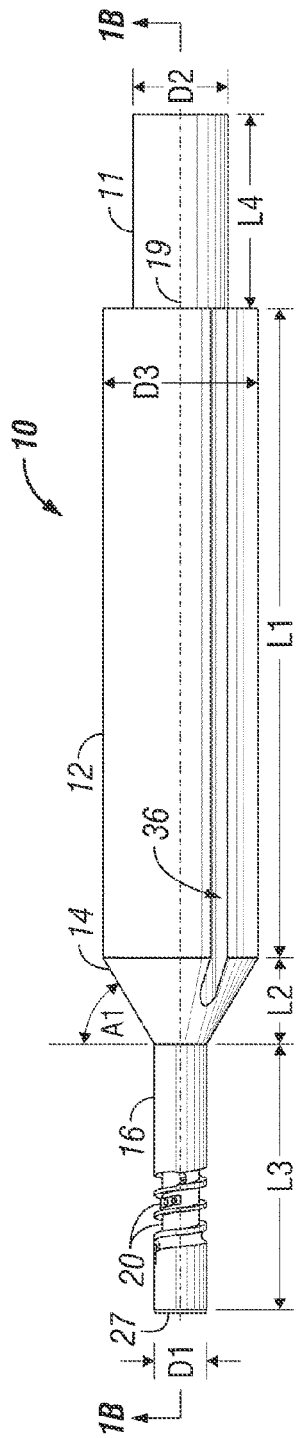
FIGS. 1a-1c show a vacuum mandrel in accordance with a preferred embodiment of the invention.

FIG. 1a shows a plan view of a vacuum mandrel 10 in accordance with a preferred embodiment of the invention. The mandrel 10 comprises an elongate hollow body member formed from stainless steel or tool steel and has an exterior finish of nickel plating with Teflon®. As illustrated FIG. 1b, the mandrel 10 is generally circular in cross section, although other cross sectional shapes are possible as well. As shown, the vacuum mandrel 10 comprises a plurality of segments 12, 14, and 16. Segment 12 has a diameter D3 that, as is evident from FIG. 1a, is greater than the diameter D1 of segment 16. In accordance with at least one embodiment, D1 is approximately 0.171 inches and D3 is approximately 0.50 inches. The length L1 of segment 12 preferably approximately is 2.094 inches and the length L3 of segment 16 preferably is approximately 0.875 inches. Segment 12 includes a tip portion 11 provided at one end as shown in FIG. 1a. Tip portion 11 has a diameter D2 of approximately 0.312 inches and a length L4 of approximately 0.625 inches. Segment 14 has a generally frustoconical shape that transitions between segments 12 and 16. The slope of segment 14 preferably is at an angle A1 of approximately 60 degrees as shown in FIG. 1a, and the length L2 of segment 14 is approximately 0.281 inches. Mandrel 10 may be formed as a unitary hollow body or in multiple pieces that are joined together in a suitable manner (e.g., by welding).

Segment 16 includes a first, preferably spiral (e.g., helical) groove 20 formed radially about the outer surface of segment 16 as shown in FIG. 1a. FIG. 2 shows an enlarged view of segment 16 of the vacuum mandrel. In the embodiments of FIGS. 1 and 2, the first groove 20 comprises a spiral groove having about 2.5 revolutions around the outer surface of the mandrel. It will be appreciated by persons of skill in the art that non-spiral grooves can be used, and that where a spiral groove is employed the number of revolutions of the groove can be varied. The first groove 20 can have any dimensions that are suitable for the application described herein. In one embodiment, the groove 20 has a generally flat bottom surface 21 and flat side walls 23 formed generally perpendicular to the bottom surface 21. In this embodiment, the groove has a rectangular cross-sectional shape, with a width W1 of approximately 0.053 to 0.058 inches and a height H1 of approximately 0.024 to 0.028 inches.

As best shown in FIG. 2, a raised surface 25 is provided within groove 20. The raised surface 25 preferably is formed integrally with the segment 12 although, in other embodiments, the raised surface can be a separately formed component that is then adhered in a suitable manner (e.g., welded, glued, etc.) to surface 21. The raised surface 25 preferably has a height relative to the bottom surface 21 of approximately 0.002 to 0.003 inches and a width W2 that is less than the width W1 of the groove 20. In one embodiment, the width W2 of the raised surface 25 may range from approximately 0.028 to 0.032 inches. In such embodiments, therefore, the width W2 of the raised surface is approximately 45% to 60% of the width W1 of the first groove 20. At least one vacuum port 22 is provided within the first groove 20. In accordance with one embodiment, eight vacuum ports 22 are provided, although any number of ports sufficient to retain an electrode in place in the first groove may be employed. Preferably, the vacuum ports 22 comprise bore holes that extend through the raised surface 25 and into the hollow interior portion of segment 16. In at least one embodiment, the eight radially extending vacuum ports 22 are spaced apart in increments of 30 degrees.

Referring to FIG. 1a, segment 12 of mandrel 10 comprises a lead groove 36 provided longitudinally along at least some or all of the length of segment 12. Referring to FIGS. 1a and 1c, the lead groove 36 that is provided longitudinally along segment 12 relative to a plane that contains central axis 19 preferably is formed in the outer surface of the segment 12 at a location disposed on an angular measure A2 from the plane. In one embodiment, the lead groove 36 preferably has a depth D8 of approximately 0.089 inches and a width W3 of approximately 0.063 inches. As will be explained above, an implantable lead resides in the lead groove 36 during fabrication of an electrode. Thus, the lead groove 36 has an engaging surface that engages the electrode during manufacturing.

Figure 1B:
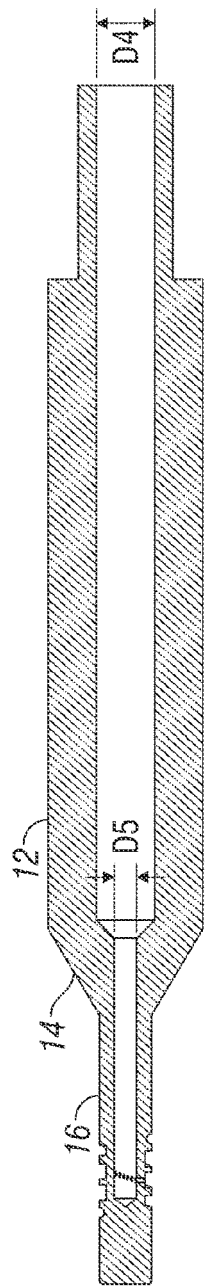
Figure 1C:
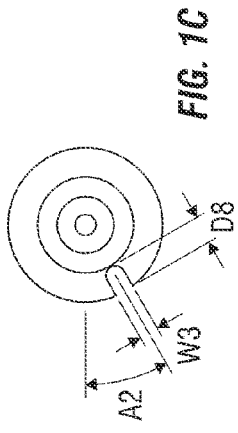
Figure 2:
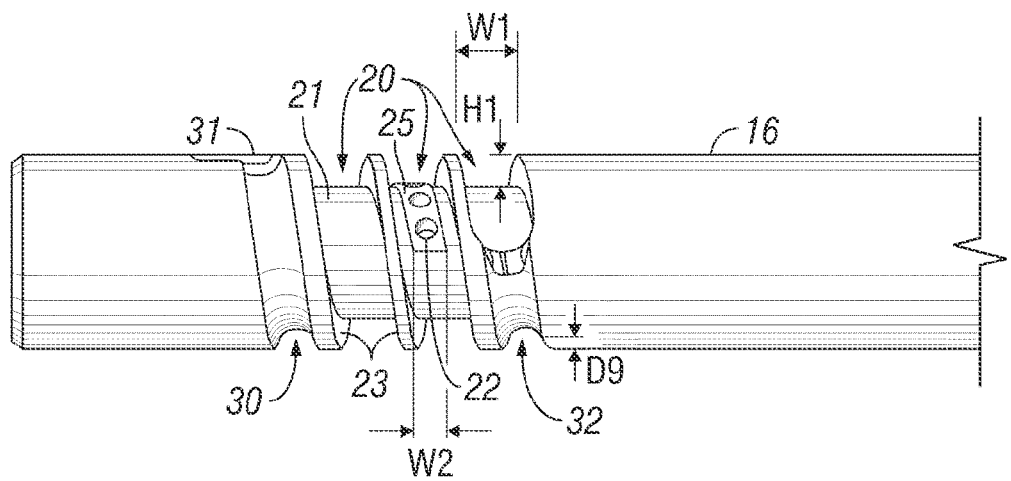
FIG. 2 shows an enlarged portion of the vacuum mandrel.

The interior of the hollow body member is shown in FIG. 1b. In the embodiment depicted, the dimensions of the hollow interior of the body vary, although persons of skill in the art will appreciate that various hollow chamber designs may be employed. The hollow interior of segment 12 is shown with a diameter D4 of approximately 0.19 inches. The hollow interior of segments 14 and 16 has a diameter D5 of approximately 0.06 inches. The hollow interior of segment 16 extends to the end of, or just beyond the end of, the first groove 20. The hollow interior may also extend throughout the hollow body and be sealed off via a plug fastened by various techniques such as welding, screw threads, or adhesive.

Figure 3:
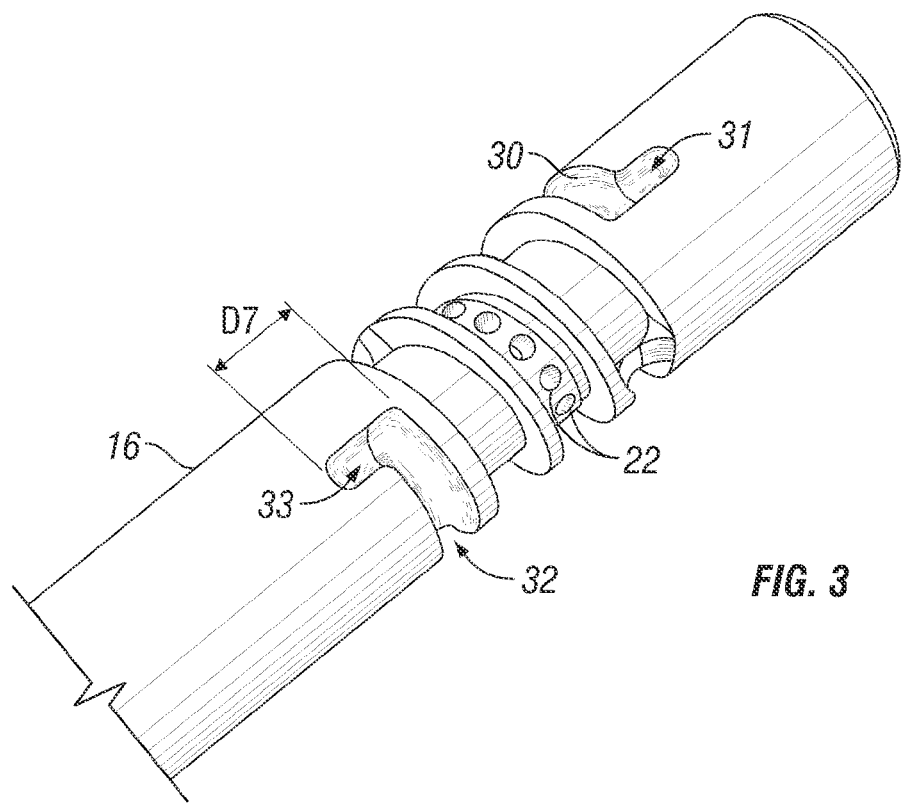
FIG. 3 shows a side of the vacuum mandrel opposite from that shown in FIGS. 1 and 2.

FIGS. 1a and 2 also show one or more second grooves 30, 32 formed at, or near, opposing ends of first groove 20. Second grooves 30 and 32 may advantageously have a different cross-sectional shape than groove 20. Each second groove 30, 32 preferably is curved and extends circumferentially preferably for less than one complete revolution around segment 16 and, in some embodiments, extends for three-fourths of one revolution. As better shown in FIG. 3, each second groove 30 and 32 ends in a longitudinal groove portion 31 and 33, respectively. Each second groove 30, 32 may have a pitch of approximately from 0.65 to 0.70, a radius of curvature of approximately 0.020 inches and a depth D9 (shown in FIG. 2) of approximately 0.018 inches. Each of the longitudinal groove portions 31 and 33 may have a length D7 (FIG. 3) of approximately 0.074 inches. Further, each second groove 30, 32 begins at or near an end of the first groove 20. For example, second groove 32 begins at end 37 (FIG. 2) of first groove 20. The beginning of each second groove 30, 32 preferably is centered within first groove 20 thereby forming a continuous groove within the body segment 16. In one embodiment, each second groove 30 and 32 preferably comprises a spiral curved groove that extends for three-fourths of a revolution and the central flat-bottom groove 20 (having bottom surface 21) extends for 2.5 revolutions. Thus, the combination of the two spiral curved second grooves 30 and 32 and the central flat first groove 20 form a groove that extends for, in a particular embodiment, four total revolutions around the body segment 16.

The vacuum mandrel 10 may be used during a manufacturing process for an electrode. The electrode preferably comprises an electrode such as may be used in conjunction with an implantable medical device such as a vagus nerve stimulator.

FIG. 4 shows an electrode 52 provided on an end of lead 50. The electrode 52 preferably is an electrically conductive ribbon electrode that, when further processed as described below, can be attached to a nerve or nerve bundle such as a cranial nerve (e.g., a vagus nerve). The electrode 52 preferably comprises a conductive ribbon electrode formed from platinum, platinum-iridium, or other suitable material. In a particular embodiment, the electrode 52 is approximately 0.040 inches wide by approximately 0.500 inches long by approximately 0.0005 inches thick. The electrode 52 is coupled (e.g., welded) to the lead 50 at approximately the mid-point of the electrode. The lead 50 comprises an electrical conductor that is covered by an insulator and that electrically couples the implanted device (not shown) to electrode 52 provided on the end of the lead. When implanted, the electrode 52 is placed in contact with the tissue to be stimulated. Through the lead 50 and electrode 52, the implanted device is able to deliver electrical current to the tissue to be stimulated.

FIG. 5 shows the body segment 16 of the vacuum mandrel 10 with the lead 50 and electrode 52 disposed thereon. The electrode 52 is placed on the mandrel and wrapped around and located within at least a portion of the first groove 20. By residing in the first groove 20, the ribbon electrode covers at least one or more, and preferably all, of the vacuum ports 22. FIG. 5 also shows the lead 50 extending down the length of the segment 16. The remaining length of the lead rests in the longitudinal lead groove 36 formed in segment 12 (FIG. 1a).

FIG. 6 illustrates the vacuum mandrel 10 coupled to a vacuum tube 62 that, in turn, connects to a vacuum source 60. The vacuum tube 62 preferably comprises a flexible hose of rubber or other suitable material. The tip 11 of the vacuum mandrel is inserted into the vacuum tube 62. Once the vacuum source 60 is turned on, the vacuum pressure thereby created through the mandrel 10 and vacuum ports 22 will cause the ribbon electrode to be retained in place during the next part of the manufacturing process. The raised surface 25 provides an engaging surface for the electrode in groove 20 and enables the electrode edges to be encapsulated by the elastomer/insulator. In one embodiment, the vacuum pressure is approximately 28 inches Hg, although the pressure can be varied as desired.

With the electrode held in place in first groove 20 by vacuum pressure, the next step in the manufacturing process is to apply an insulator such as an elastomer to all, or substantially all, of the lengths of first groove 20, and second grooves 30 and 32, thereby covering the ribbon electrode with the insulator. The ribbon electrode 52 preferably does not extend throughout the combined lengths of first groove 20 and second grooves 30 and 32, and as such a portion of the insulator fills the grooves beyond the reach of the ribbon electrode. The insulator is applied by spraying or pouring by methods well known in the art. In a particular embodiment, the insulator comprises a silicone elastomer. However, persons of skill in the art will appreciate that other elastomers, and other insulators may be used.

Figure 7:
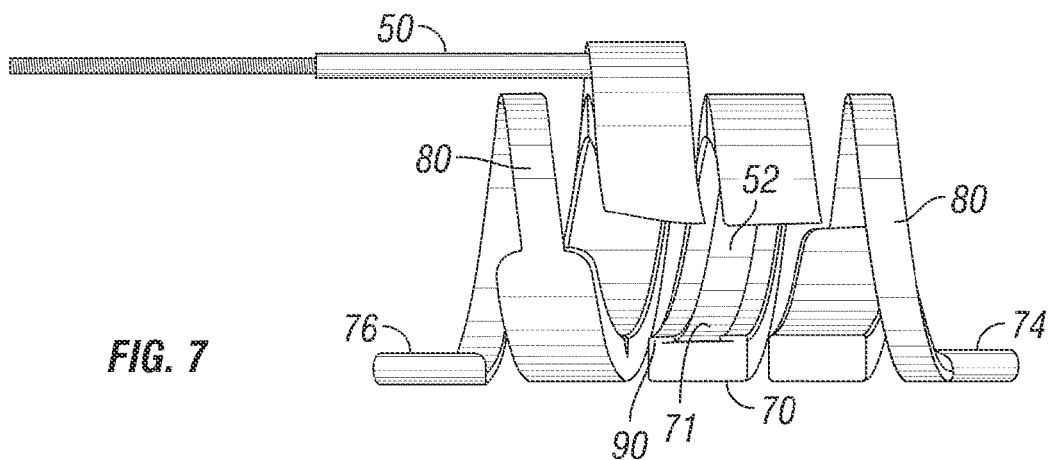
FIG. 7 shows a lead with coil electrode formed thereon and elastomer formed on a portion of the electrode in accordance with a preferred embodiment of the invention.
Figure 8:
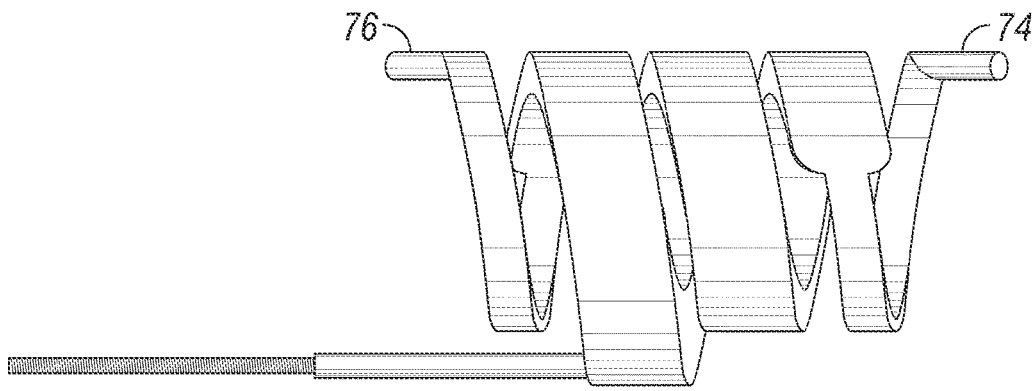
FIG. 8 shows a completed electrode assembly in accordance with embodiments of the invention.

The insulator is then permitted to cure. Once cured, vacuum source is turned off and the lead 50 and insulator-covered electrode 52 assembly can be removed from the vacuum mandrel. Examples of the completed electrodes 52 are shown in FIGS. 7 and 8. FIG. 7 shows an electrode with a cut away portion to better illustrate the elastomer 70 covering the ribbon electrode 52. Because the elastomer cured while the electrode 52 was still wrapped in the spiral first groove 20 of the vacuum mandrel, the resulting electrode generally retains the shape of the first groove 20. Other shapes are, of course, possible depending upon the needs of the particular application in which the electrode will be used. Further, because the elastomer covered the exposed electrode 52 and was not able to penetrate between the electrode 52 and the raised surface 25 of the first groove 20, one side of the electrode is not covered with elastomer, i.e., the interior surface 71 of the spirally formed electrode. This interior surface is the surface that will be in contact with the body tissue (e.g., a vagus nerve) being stimulated. The elastomer generally is an electrical insulator and thus the surface of the electrode opposite the body tissue is electrically insulated from other body tissues while the surface of the electrode touching the nerve is in electrical contact with the nerve.

Figure 9:
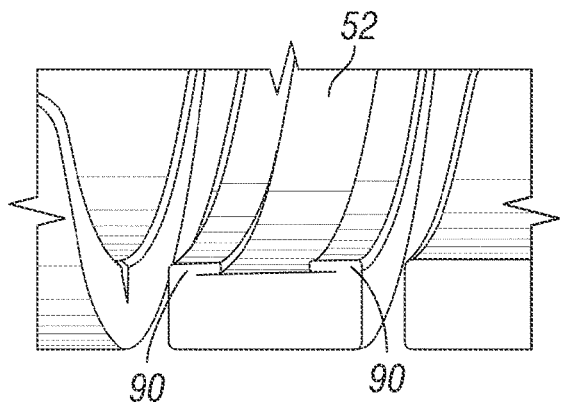
FIG. 9 shows an enlarged portion of FIG. 7.

The raised surface 25 on which the ribbon electrode rests while the elastomer is applied causes elastomer to fill the sides of the first groove 20 adjacent the electrode. As a result, some of the elastomer, such as that shown at reference numeral 90, covers the side edges of the ribbon electrode and thereby covers any sharp edges that might otherwise cut into the nerve to which the electrode is attached. The relationship between the elastomer and the edges of the electrode are better shown in the enlarged view of FIG. 9.

Reference numeral 80 in FIG. 7 shows the elastomer that was applied to the spiral second grooves 30 and 32. The width of second grooves 30 and 32 preferably is less than the width of first groove 20 as measured in the direction parallel to axis 19. As such, as shown in FIG. 7, the two elastomer end portions 80 of the electrode assembly are narrower than the central portion that contains the ribbon electrode.

The longitudinal groove portions 31 and 33 (FIG. 3) are also filled with elastomer. After the elastomer cures and the electrode is removed from the mandrel, the elastomer that filled the longitudinal groove portions 31 and 33 form gripping portions 74 and 76, respectively. The gripping portions 74 and 76 are used during implantation to attach the electrode to the nerve. More specifically, the gripping portions 74 and 76 are pulled in opposite directions using, for example, forceps. Pulling the gripping surfaces 74 and 76 apart in this manner stretches the spiral electrode so that it can be wrapped around the nerve. Once wrapped around the nerve, the gripping portions 74 and 76 are released and the spring-like nature of the spiral electrode 52 causes the electrode naturally to attach itself to the nerve.

Another prior type of spiral electrode included a thread suture embedded in the elastomer. The ends of the suture protruded from the electrode and functioned as gripping mechanisms for the implantation surgeon. Unfortunately, embedding a thread suture in a spiral electrode adds complexity and time to the manufacturing process of such an electrode. Gripping portions 74 and 76 obviate the need for such a thread suture, although one could be included if desired. Without such a thread suture, the manufacturing of the disclosed electrode is made easier and less time consuming.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of making an electrode, comprising:
   providing a mandrel comprising a first groove in an outer surface thereof, a vacuum port in said first groove, and at least one longitudinal groove formed at one end of said first groove,
   providing an electrode coupled to an end of a lead;
   positioning said electrode in said first groove over said vacuum port;
   retaining said electrode in said first groove through vacuum pressure applied through said vacuum port; and
   applying an elastomer over said conductive electrode and to said at least one longitudinal groove while said electrode is retained in said first groove.

2. A method of making an electrode, comprising:
   positioning an electrode in a raised surface of a first groove in an outer surface of a mandrel, said first groove comprising a vacuum port;
   retaining said electrode in said first groove through vacuum pressure applied through said vacuum port; and
   applying an elastomer over said conductive electrode while said electrode is retained in said first groove.

3. The method of claim 1 wherein providing the mandrel comprises providing a pair of second longitudinal grooves formed at opposing ends of said first groove.

4. The method of claim 1 wherein providing the mandrel comprises providing a raised surface in the first groove on which the vacuum port is provided.

5. The method of claim 1 wherein the first groove comprises a spiral groove.

6. The method of claim 1 wherein a portion of the first groove has a different cross-section shape than another portion of the first groove.

7. The method of claim 2 wherein applying the elastomer comprises applying the elastomer to at least one longitudinal groove provided at an end of the first groove.

8. The method of claim 2 wherein the first groove comprises a spiral groove.

9. The method of claim 2 wherein a portion of the first groove has a different cross-section shape than another portion of the first groove.

* * * * *